(12) United States Patent
Bucher, Jr. et al.

(10) Patent No.: US 7,638,113 B2
(45) Date of Patent: Dec. 29, 2009

(54) PROCESS FOR MAKING TITANIUM DIOXIDE

(75) Inventors: Robert E Bucher, Jr., Newark, DE (US); James Timothy Cronin, Townsend, DE (US); Yung-Hsing Samson Hsu, Gulfport, MS (US); Charles David Musick, Waverly, TN (US); Kunle Ogunde, Landenberg, PA (US); Robert J. Rossi, Mendenhall, PA (US); Barbara A. Kirsch, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 282 days.

(21) Appl. No.: 11/546,764

(22) Filed: Oct. 12, 2006

(65) Prior Publication Data

US 2008/0089833 A1   Apr. 17, 2008

(51) Int. Cl.
  *C01G 23/047* (2006.01)
(52) U.S. Cl. ..................... 423/613; 502/350
(58) Field of Classification Search ............... 502/350; 423/613
  See application file for complete search history.

(56) References Cited

U.S. PATENT DOCUMENTS

| | | | | |
|---|---|---|---|---|
| 2,915,364 | A | * 12/1959 | Clabaugh et al. | ............ 423/76 |
| 3,640,744 | A | * 2/1972 | Dietz et al. | ............ 106/438 |
| 5,556,600 | A | 9/1996 | Gebben et al. | |
| 5,562,764 | A | 10/1996 | Gonzalez | |
| 5,573,744 | A | 11/1996 | Gebben et al. | |
| 6,562,312 | B2 | 5/2003 | Cronin et al. | |

(Continued)

FOREIGN PATENT DOCUMENTS

EP   0654446   5/1995

(Continued)

OTHER PUBLICATIONS

Diebold et. al.. Technical Challenges for the TiO2 Industry. 2004. JCT Coatings Tech.

(Continued)

*Primary Examiner*—Melvin C Mayes
*Assistant Examiner*—Melissa Stalder

(57) ABSTRACT

The disclosure relates to a process for making titanium dioxide, comprising: reacting titanium tetrachloride with oxygen by contacting the titanium tetrachloride with the oxygen in a vapor phase reactor under mixing conditions and at an elevated temperature to form a gaseous product stream containing titanium dioxide; separating the titanium dioxide from the gaseous product stream to form a process stream; analyzing the process stream to detect a concentration of titanium tetrachloride in the process stream; comparing the concentration of titanium tetrachloride detected in the process stream to an aim point concentration; and modifying the oxidation conditions to restore or maintain the concentration of titanium tetrachloride in the process stream at the aim point. In one embodiment, the process further comprises contacting the gaseous product stream with silicon tetrachloride under mixing conditions and at an elevated temperature to at least partially encapsulate the titanium dioxide with a silicon-containing compound and separating the at least partially encapsulated titanium dioxide from the gaseous product stream and analyzing the process stream to detect a concentration silicon tetrachloride for comparison to a silicon tetrachloride aim point concentration so that the conditions for silicon tetrachloride contacting can be modified to restore or maintain the concentration of silicon tetrachloride in the process stream.

23 Claims, 1 Drawing Sheet

U.S. PATENT DOCUMENTS

| | | | |
|---|---|---|---|
| 6,852,306 B2 * | 2/2005 | Subramanian et al. | 423/613 |
| 7,029,648 B2 * | 4/2006 | Subramanian et al. | 423/613 |
| 2002/0114761 A1 * | 8/2002 | Akhtar et al. | 423/612 |
| 2004/0166054 A1 | 8/2004 | Turnbaugh, Jr. et al. | |
| 2004/0235179 A1 | 11/2004 | Turnbaugh, Jr. et al. | |
| 2004/0258610 A1 | 12/2004 | Subramanian et al. | |

FOREIGN PATENT DOCUMENTS

| | | |
|---|---|---|
| WO | WO01/02299 | 1/2001 |

OTHER PUBLICATIONS

International Search Report, Jun. 3, 2008.

* cited by examiner

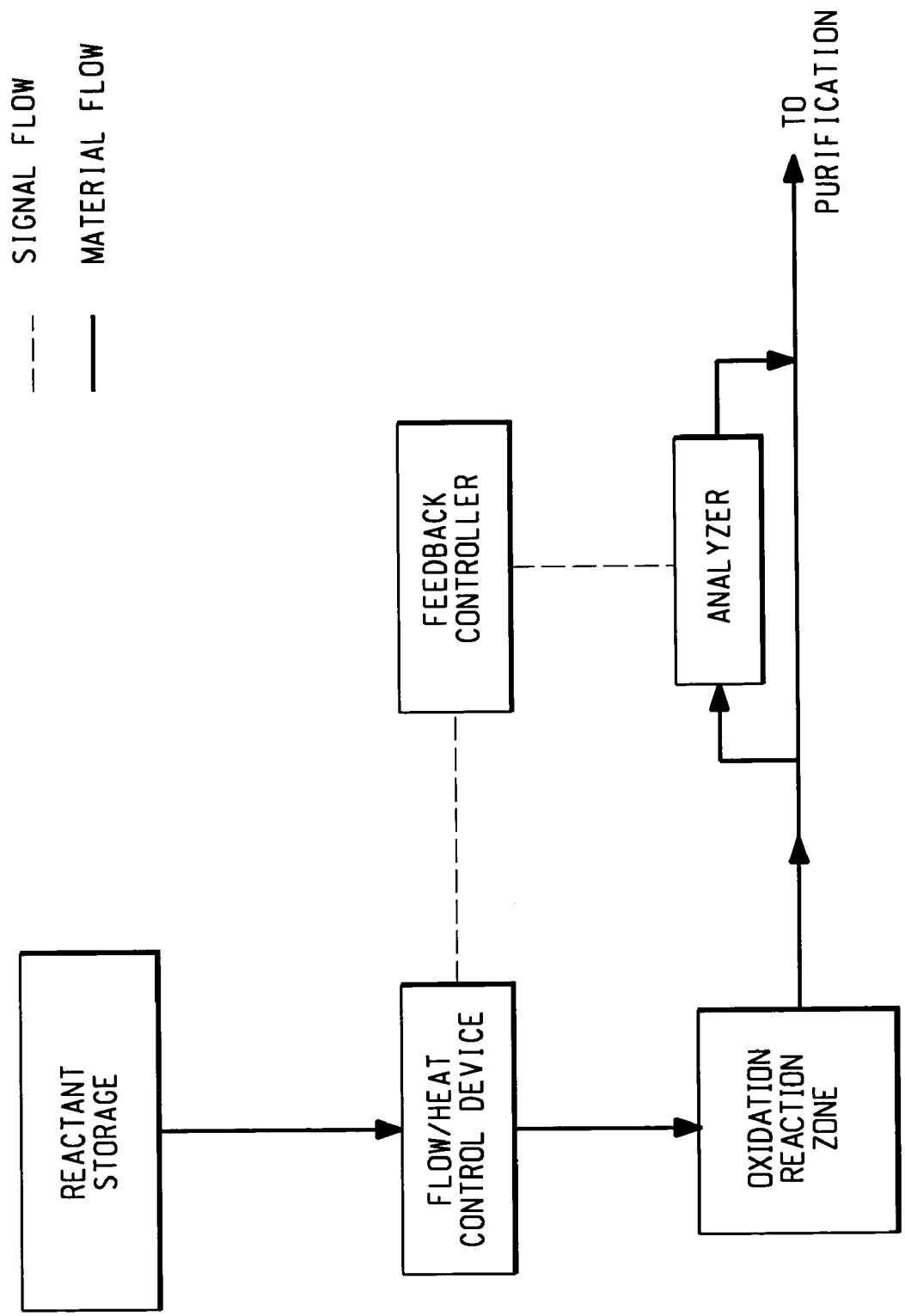

PROCESS FOR MAKING TITANIUM DIOXIDE

BACKGROUND OF THE INVENTION

1. Field of the Invention

The disclosure relates to a process for making titanium dioxide. The disclosure additionally relates to contacting the titanium dioxide with silicon tetrachloride to form surface-treated titanium dioxide. Yet additionally, the disclosure relates to using an analyzer to control the conditions for making titanium dioxide or contacting the titanium dioxide with silicon tetrachloride or both to improve the process by optimizing process efficiency.

2. Description of the Related Art

The chloride process for making titanium dioxide pigment is well known. In the chloride process, $TiCl_4$ resulting from chlorination of titanium-containing material such as rutile ore is oxidized to form $TiO_2$ particles. The chloride process is described in greater detail in "The Pigment Handbook", Vol. 1, 2nd Ed., John Wiley & Sons, N.Y. (1988), the teachings of which are incorporated herein by reference.

A process for making a durable grade titanium dioxide pigment, without the necessity of depositing surface treatments on the titanium dioxide by wet treatment has been described in U.S. Pat. No. 5,562,764 of Gonzalez and U.S. Pat. No. 7,029,648 of Subramanian et al. In these disclosures silicon tetrachloride is contacted with a titanium dioxide stream at one or more points downstream from the point where titanium tetrachloride and oxygen are contacted to form the titanium dioxide. The resulting titanium dioxide product has a surface treatment of a silicon-containing material which enhances durability.

In the oxidation of titanium tetrachloride to form titanium dioxide, it is useful to optimize the conditions to avoid having titanium tetrachloride present in the product stream. The titanium tetrachloride in the product can lead to a variety of problems. In particular, if water is present in downstream operations it can convert titanium tetrachloride to titanium oxychloride species which can cause severe processing problems including "bag filter blinding" in which titanium oxychlorides clog filter pores in the pigment separation process, and blower fouling in which titanium oxychlorides accumulate on blower internals causing a lower compression ratio. In addition titanium tetrachloride can cause jet pluggage in which titanium tetrachloride in the feed jets cause poor gas distribution in the chlorinator. Additionally, the resulting titanium dioxide pigment product can have poor acid solubility because soluble titania present in the product can impair silica deposition during aqueous treatments to improve the acid solubility properties of the pigment. To avoid these problems, operators tend to utilize excessive heat during the oxidation step which is wasteful.

In the step of contacting the titanium dioxide product stream with silicon tetrachloride it has been found that if the temperature is too low silicon tetrachloride can remain unreacted. If the temperature is too high the quality of the resulting at least partially encapsulated product is poor either the encapsulation layer is fragile or many particles are not fully encapsulated leading to a product which lacks suitable durability.

The process of this disclosure overcomes these problems by integrating the process with an analyzer capable of analyzing for titanium tetrachloride or silicon tetrachloride or both.

SUMMARY OF THE INVENTION

The disclosure is directed to a process for making titanium dioxide, comprising:

(a) reacting titanium tetrachloride with oxygen by contacting the titanium tetrachloride with the oxygen in an oxidation reactor under oxidation conditions to form a gaseous product stream containing titanium dioxide;

(b) separating the titanium dioxide from the gaseous product stream to form a process stream;

(c) analyzing the process stream to detect a concentration of titanium tetrachloride in the process stream;

(d) comparing the concentration of titanium tetrachloride detected in the process stream to a titanium tetrachloride aim point concentration; and (e) modifying the oxidation conditions to restore or maintain the concentration of titanium tetrachloride in the process stream at the aim point.

In one embodiment, step (a) further comprises contacting the gaseous product stream with silicon tetrachloride under conditions effective for forming a treated product stream comprising titanium dioxide treated with a silicon-containing compound and wherein in step (b) the gaseous product stream is the treated product stream and the titanium dioxide is separated from the treated product stream. In this embodiment, additionally, step (c) further comprises analyzing the process stream to detect a concentration of silicon tetrachloride in the process stream and step (d) further comprises comparing the concentration of silicon tetrachloride detected in the process stream to a silicon tetrachloride aim point concentration; and step (e) further comprises modifying the conditions for contacting the gaseous product stream with silicon tetrachloride to restore or maintain the concentration of silicon tetrachloride in the process stream at the silicon tetrachloride aim point. Yet additionally, in this embodiment step (e) further comprises modifying the mixing conditions or the temperature or both to reduce the concentration of titanium tetrachloride in the process stream to reach the titanium tetrachloride aim point.

In another embodiment, the disclosure relates to a process for making titanium dioxide, comprising:

(a) reacting titanium tetrachloride with oxygen by contacting the titanium tetrachloride with the oxygen in an oxidation reactor under oxidation conditions to form a gaseous product stream containing titanium dioxide;

(b) contacting the gaseous product stream with silicon tetrachloride under conditions effective for treating the titanium dioxide with a silicon-containing compound to form a treated product stream;

(c) separating the treated titanium dioxide from the treated product stream to form a process stream;

(d) analyzing the process stream to detect a concentration of silicon tetrachloride;

(e) comparing the concentration of silicon tetrachloride detected in the process stream to a silicon tetrachloride aim point concentration; and (g) modifying the conditions for contacting the gaseous product stream with silicon tetrachloride to restore or maintain the concentration of silicon tetrachloride in the process stream at the silicon tetrachloride aim point. In this embodiment, the process, additionally can comprise analyzing the process stream to detect a concentration of titanium tetrachloride; comparing the concentration of titanium tetrachloride in the process stream to a titanium tetrachloride aim point concentration; and modifying the oxidation conditions to restore or maintain the concentration of titanium tetrachloride in the gaseous product stream or the process stream at the titanium tetrachloride aim point.

BRIEF DESCRIPTION OF THE DRAWINGS

The FIGURE is a simplified schematic flow diagram of the process of this disclosure.

DETAILED DESCRIPTION OF THE INVENTION

The titanium tetrachloride which is a starting material of the process can be formed by chlorination of titanium-bearing material such as rutile ore. The starting material of the process can also include a source of one or more of aluminum, such as aluminum trichloride, silicon, such as silicon tetrachloride, boron, phosphorous, zirconium and the like.

In the titanium tetrachloride oxidation, the titanium tetrachloride can be preheated to a temperature of from about 300 to 650° C. and mixed with aluminum trichloride forming a chloride mix which is fed into a heated stream of oxygen. This chloride mix may contain other metal compounds used in the chloride pigment manufacture including compounds of silicon, boron, phosphorous, zirconium, and the like. The titanium tetrachloride and oxygen can react in a vapor phase reactor under mixing conditions and at an elevated temperature to form a gaseous product stream containing titanium dioxide. The vapor phase reactor can be a typical oxidation reactor as well-known in the art of titanium dioxide pigment production.

One or more phosphorous compounds can be introduced into the reactor. The introduction of one or more phosphorus compounds is generally positioned to control corrosion and may be at some point downstream of the point where titanium tetrachloride and aluminum source are introduced into the reactor.

For convenience the addition of the aluminum source can be in a mixture with the titanium tetrachloride.

Oxygen can be present as an initial reactant. Although the process can be run with the oxygen in excess of the amount required to oxidize the chloride mix, the process may be operated with the concentration equal to or less than the stoichiometric amount. A gaseous product stream containing titanium dioxide results from reacting titanium tetrachloride and oxygen.

The titanium dioxide is separated from the gaseous product stream by any well known titanium dioxide separation technique. The resulting process stream, from which substantially all if not all the titanium dioxide has been removed, is analyzed as described herein to detect a concentration of titanium tetrachloride in the process stream. The concentration of titanium tetrachloride in the process stream is compared to a titanium tetrachloride aim point concentration. Depending upon the results of the comparison, to adjust the oxidation conditions to achieve the titanium tetrachloride aim point, usually adjusting the mixing conditions or the temperature or both in the step of reacting titanium tetrachloride with oxygen can restore or maintain the concentration of titanium tetrachloride in the process stream at the titanium tetrachloride aim point. Techniques for adjusting the mixing conditions and the temperature in order to restore or maintain the concentration of titanium tetrachloride in the process stream would be apparent to those skilled in the art of making titanium dioxide. However, as an example, the temperature can be adjusted by heating or cooling one or more of the reactants and the mixing conditions can be adjusted by increasing or decreasing the flow of one or more of the reactants.

In one embodiment, silicon tetrachloride-treated titanium dioxide can be formed in the process. In this embodiment, silicon tetrachloride can be contacted with the gaseous product stream typically under conditions effective for treating the titanium dioxide with a silicon-containing compound derived from the silicon tetrachloride, such as silica, and preferably under conditions effective for at least partially encapsulating the titanium dioxide with the silicon-containing compound. Processes for treating titanium dioxide with silicon tetrachloride have been described in U.S. Pat. No. 5,562,764 of Gonzalez and U.S. Pat. No. 7,029,648 of Subramanian et al. which are hereby incorporated by reference in their entireties. Treating titanium dioxide with silicon tetrachloride in the gas phase can be useful to make durable titanium dioxide.

For contacting the gaseous product stream with silicon tetrachloride, a suitable point of addition of silicon tetrachloride can be determined by determining when the conversion of titanium tetrachloride to titanium dioxide is nearly complete or fully complete. For example, when at least 97% of the titanium tetrachloride has been converted to titanium dioxide. That is, the point where not more than 3% of the titanium tetrachloride remains unreacted.

Additionally, the point of addition of silicon tetrachloride can be determined, when the present process is run with at least the stoichiometric amount of oxygen, using the following equations:

$$K = \frac{[2(100\% - u_{TiCl4}) + \phi \times 100\%]^2}{u_{TiCl4}(\beta + u_{TiCl4})}$$

and $$T < \frac{20733}{\ln k + 6.391} - 273.15$$

where $u_{TiCl4}$ = unreacted TiCl4(%)

$\beta$ = excess O2(%)

$\phi$ = feed Cl2 mole ratio (mol/mol TiCl4), and $T$ = temperature (C.)

K is the equilibrium constant for the reaction of the present process:

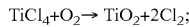

Using this equation, one may calculate the point where the silicon tetrachloride is first introduced from the feeds going into the reactor. Excess oxygen, $\beta$, is the oxygen in excess of that required to convert the mixture of titanium tetrachloride and aluminum trichloride fed into the reactor to their respective oxides (the stoichiometric amount). The feed chlorine mole ratio, $\phi$, is the ratio of the moles of chlorine fed divided by the moles of titanium tetrachloride fed to the reactor over a fixed period of time, for example, per hour. The percent unreacted titanium tetrachloride, $U_{TiCl4}$, is not more than 3% as is required by the present invention. Using the calculated equilibrium constant, K, one can then solve for the temperature at the point where silicon tetrachloride is first introduced according to the present invention. The point in the reactor where this introduction is made according to the present invention may be determined using the temperature profile of the particular reactor.

This calculation is independent of reactor size and pressure and requires only knowledge of the feed composition (oxygen, chlorine and titanium tetrachloride in moles per hour) and the temperature profile for the reactor. Temperature profiles for a given reactor may be determined from well-known thermodynamic and heat transfer principles.

This method of calculating the addition points provide some flexibility, based on the feed mix that may be of importance in designing product features to serve a particular pigment end use application.

The disclosure additionally relates to a process for making durable titanium dioxide pigment by vapor phase deposition of surface treatments on the titanium dioxide particle surface, the process comprising the steps of:

(a) reacting titanium tetrachloride vapor and aluminum chloride and at least a stoichiometric amount of oxygen in a reactor, typically in a plug flow reactor, to form a product stream containing titanium dioxide particles; and (b) introducing silicon tetrachloride into the reactor at one or more points downstream of the point where the titanium tetrachloride and oxygen were contacted and where at least 97% of the titanium tetrachloride has been converted (3% unreacted titanium tetrachloride) to titanium dioxide.

The durable titanium dioxide pigment can be made by vapor phase deposition of surface treatments on the titanium dioxide pigment particle surface and may also be operated with a mixture of titanium tetrachloride and aluminum trichloride where the oxygen may be present in an amount less than the stoichiometric amount. In this case the process comprises:

(a) reacting titanium tetrachloride vapor, an oxygen containing gas and aluminum chloride in a reactor, typically in a plug flow reactor, to form a product stream containing titanium dioxide particles; and (b) introducing silicon tetrachloride into the reactor at one or more points downstream of the point where the titanium tetrachloride and oxygen were contacted and where the reaction temperature is no greater than about 1200° C.

In this case one would use the reactor temperature profile to locate a point where the reaction temperature is no greater than about 1200° C., and preferably no greater than 1100° C. The addition of silicon tetrachloride would be made at this point or a point down stream of this calculated location. The use of the temperature profile and the requirement that the addition of silicon tetrachloride be made at a location where the reaction temperature is less than about 1200° C. is useful in cases where oxygen is present in excess, just equal to or less than the stoichiometric amount needed to oxidize the chloride mix.

The process of this disclosure can be used to make durable titanium dioxide pigment. The term durable as used herein means a pigment suitable for exterior architectural coatings and automotive refinish or color coat or clear coat original equipment manufacturer finishes. Generally such pigments are characterized in that no more than about 25% of the pigment dissolves in sulfuric acid in the acid solubility test, and that silicon dioxide represents at least 1.4 to 2% of the total weight of the pigment. The acid solubility test is described in Diebold et al. "Rapid Assessment of $TiO_2$ Pigment Durability via the Acid Solubility Test", JCT Research, July 2004 which is incorporated herein by reference.

In one embodiment of the disclosure, the composition of the oxide treatment deposited is a mixture of amorphous aluminum oxide and amorphous silicon dioxide. The thickness of the treatment layer deposited in the present invention is not more than about 4 nm. Typically, the pigment is more than 99% rutile.

It is believed that the uniformity and the completeness of the surface treatment layer in the present pigments results in acid solubilities of less that 25% even at silica concentrations of about 1% by weight of the total pigment.

Full, complete coverage of the particles means that the entire surface of the titanium dioxide particle is covered with the layer of surface treatment. The product of the present invention is characterized by the fact that at least 85% of the particles are fully and completely covered by a layer of surface treatment. This layer is typically thin and uniform. The thickness of the layer can range from about 1 to 4 nm for particles that are about 1% by weight aluminum oxide and 1.2% by weight silicon dioxide. Higher concentrations of the surface treatment are expected to produce thicker layers, but usually at equal uniformity. Microscopic analysis of the product has shown that about 80% or more of the pigment particles of the present invention have a treatment layer thickness of 1 to 2.5 nm, while in less than about 5% of the pigment particles, the treatment layer is about 4 nm thick.

Titanium dioxide can be produced by reacting a titanium dioxide ore with chlorine to produce titanium tetrachloride. Once the titanium tetrachloride is purified, it is vaporized and reacted with oxygen at a high temperature to produce titanium dioxide. The titanium dioxide and chlorine are cooled and separated. Full conversion of titanium tetrachloride to titanium dioxide is desirable. Incomplete conversion of the reaction may be caused by lack of oxygen, poor mixing between the titanium tetrachloride and oxygen or low total heat available to initiate the reaction.

An analyzer is used to detect titanium tetrachloride in the gas stream after separating titanium dioxide and, optionally, after separating any titanium oxychlorides or silicon oxychlorides. If titanium tetrachloride is present the operator, which can be human or computer, may modify the reaction conditions to at least substantially eliminate the unreacted titanium tetrachloride.

The operator may elect to modify the conditions by increasing or decreasing the mixing of the oxygen and the titanium tetrachloride or by increasing or decreasing the mixing of the gaseous first product stream and the silicon tetrachloride. This can be accomplished by increasing or decreasing the flow of one or more of the reactants. It can also be accomplished by adjusting process pressure or changing temperatures of the starting materials to the reactor. Additionally, it can be accomplished by physically removing buildup in the reactor. Additionally it can be accomplished by moving the point of addition of silicon tetrachloride closer to or farther from the point where the titanium tetrachloride and the oxygen are initially contacted.

The disclosure additionally relates to an in-process, real time control loop capable of measuring titanium tetrachloride, silicon tetrachloride or both remaining unreacted in the production of titanium dioxide followed by contacting the titanium dioxide optionally treated with silicon tetrachloride to form surface treated titanium dioxide, comprising:

(a) providing starting materials selected from the group consisting of titanium tetrachloride, silicon tetrachloride and mixtures thereof to a vapor phase reactor;

(b) reacting the titanium tetrachloride with oxygen by contacting the titanium tetrachloride with the oxygen under mixing conditions and at an elevated temperature to form a gaseous first product stream containing titanium dioxide, (c) optionally, contacting the gaseous first product stream with the silicon tetrachloride, optionally at one or more points downstream of the point where the titanium tetrachloride and oxygen were contacted, by mixing the gaseous first product stream with the silicon tetrachloride at an elevated temperature to form a gaseous second product stream comprising silicon tetrachloride-treated titanium dioxide that is typically at least partially encapsulated by a silicon-containing compound, the gaseous second product stream further comprising a quantity of gaseous titanium tetrachloride or gaseous silicon tetrachloride or both;

(d) separating the titanium dioxide from the first gaseous product stream or the treated titanium dioxide from the second product stream or both to produce a process stream that can contain a quantity of titanium tetrachloride or silicon tetrachloride or both;

(e) measuring in-process the concentration of titanium tetrachloride or silicon tetrachloride or both in the process stream;

(f) comparing the measured concentration of titanium tetrachloride or silicon tetrachloride or both to that of the aim point concentrations for titanium tetrachloride and silicon tetrachloride; and (g) adjusting the temperature for reacting titanium tetrachloride and oxygen or contacting the gaseous first product stream with silicon tetrachloride or the mixing of the titanium tetrachloride with oxygen or the mixing of the gaseous first product stream with silicon tetrachloride to restore or maintain the concentration of titanium tetrachloride and silicon tetrachloride at the aim points.

The aim point for titanium tetrachloride and silicon tetrachloride can be the same or different and can depend upon the desired process operation and suitable aim points would be apparent to a person skilled in the art of titanium dioxide manufacturing. However, the aim point for titanium tetrachloride, silicon tetrachloride or both can be zero.

The process of this disclosure can use an analyzer for determining the presence of titanium tetrachloride, silicon tetrachloride or both in the process stream which results from separating the at least partially encapsulated titanium dioxide from the treated product stream. Even with 3% unreacted titanium tetrachloride in the process stream, the encapsulation of the titanium dioxide with silicon dioxide can be further enhanced by operating at the point where a minor amount of unreacted silicon tetrachloride is present, typically where an amount of less than about 10% of silicon tetrachloride is present based on the entire amount of silicon tetrachloride.

In the present process the concentration of titanium tetrachloride or silicon tetrachloride or both can be measured by an optical method selected from the group consisting of transmission filter Infrared spectroscopy, transmission Fourier Transform Infrared spectroscopy, Raman spectroscopy, Near Infrared Spectroscopy and Ultraviolet spectroscopy. The measurement of the concentration can be made in a frequency range selected from 200 nm to 400 nm, 12,500 $cm^{-1}$ to 4000 $cm^{-1}$, and 4000 $cm^{-1}$ to 400 $cm^{-1}$.

For accuracy and precision, the presence and the concentration of at least one of titanium tetrachloride or silicon tetrachloride can be measured by Transmission Gas phase FTIR 619 $cm^{-1}$ ($SiCl_4$) and 499 $cm^{-1}$ ($TiCl_4$). For diagnostic information about the process, the quantity of common combustion products such as HCl, $CO_2$, and NOCl can be measured using FTIR. Suitable Process FTIR equipment are commercially available from any number of analyzer vendors such as Hamilton-Sunstrand.

The term "real-time" means actual time when at least one of the steps of reacting titanium tetrachloride and oxygen or contacting the titanium dioxide with silicon tetrachloride are taking place in the process. Thus, the in-process, real-time control loop of this disclosure provides a way to optimize oxidation reaction conditions without excess heat or raw materials such as, without being limited thereto, oxygen.

Moreover, the disclosure provides a way to optimize the contacting conditions to avoid unreacted titanium tetrachloride or silicon tetrachloride or both in the product. The process can improve the titanium dioxide encapsulation with a given quantity of silicon tetrachloride.

The analysis is usually conducted on the cooled gaseous product stream but it could be conducted on the gaseous product stream after the baghouse but before the stream has cooled.

The entire content of the gaseous product stream can be analyzed, for example using a Raman spectroscopy in-line analyzer. Alternatively, an extractive sampling technique can be used in which a sample of the gaseous product stream is removed from the process, filtered, and transferred to the analyzer, typically, by means of a heated sample line using, for example, FTIR spectroscopy. In the extractive sampling technique, the sample is usually temperature and pressure adjusted for the analyzer. Once the analysis is conducted on the sample the sample can be sent back to the process or sent to a scrubber. Alternatively, a single detector may be located downstream from both the first zone and the second zone preferably downstream of the gas-solid separation equipment. Its actual location is not critical as long as it is located in an area where the temperature ensures that titanium tetrachloride and silicon tetrachloride will be in the vapor phase. Measurement of the concentration of titanium tetrachloride and silicon tetrachloride can be made following in-line filtering or screening out of interfering particles or other materials.

In general the operation of the present process may be described by a typical process control loop, somewhat similar to the kind disclosed in U.S. Pat. No. 6,562,312, which is shown the FIGURE. The control loop comprises a control devise, a feedback controller, and an analyzer. The analyzer measures the concentration of at least one of titanium tetrachloride and silicon tetrachloride downstream. Typically any oxychloride species resulting from partial or incomplete oxidation of the starting materials such as titanium tetrachloride or silicon tetrachloride are removed before the analyzing step. The analyzer produces an output signal representing the measured concentration of at least one of titanium tetrachloride and silicon tetrachloride. This output signal is sent to the feedback controller. There the concentration of the titanium tetrachloride and silicon tetrachloride measured by the analyzer is compared to the aim point which is usually predetermined. The feedback controller, based on this comparison, provides input to the control device, shown in the FIGURE as a flow/heat control device for adjusting the flow or the heat of the reactants or both. The flow/heat control device can adjust one or more of the temperatures and the mixing conditions of the oxidation reactor or downstream of the oxidation reactor, shown in the figure as the oxidation reaction zone, to restore or maintain the concentration of the titanium tetrachloride and silicon tetrachloride at the aim point.

Algorithms used in the analyzer and the feed back controller to convert the data collected to a signal output are not critical. One skilled in this art can select or design an algorithm suitable to the specific type of analyzer or feedback controller. The control device may be any regulated flow device equipped with an automatic actuator. Typically the control device is a valve.

The present control loop responds rapidly to variations in temperatures and mixing indirectly by comparing the concentration of titanium tetrachloride and silicon tetrachloride present at a certain time with the concentration selected as the aim point. It is desirable to set the aim point at the lowest reliable concentration of titanium tetrachloride and silicon tetrachloride that is detected by the analytical detection devise usedin the control loop.

Any suitable analytical detection method may be used in the process as discussed herein above. Using the techniques disclosed herein, titanium tetrachloride in concentrations as low as (10 ppm) can be measured. Using the techniques disclosed herein silicon tetrachloride in concentrations as low as about 10 ppm can be measured.

The process of this disclosure provides a real-time, in-process control at an aim point. The present control loop that is fast and is responsive to the demands of continuous in-process operation.

The disclosure can provide a process with lower $Cl_2$ yield loss due to lower fuel consumption in oxidation since less fuel needed to heat oxygen reduces $Cl_2$ yield loss.

The process stream can be a recycle stream which is recycled back to one or more steps of the process such as the step for reacting titanium tetrachloride with oxygen or the step for contacting the gaseous product stream with silicon tetrachloride.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The description of illustrative and preferred embodiments of the present invention is not intended to limit the scope of the invention. Various modifications, alternative constructions and equivalents may be employed without departing from the true spirit and scope of the appended claims.

What is claimed is:

1. A process for making titanium dioxide, comprising:
   (a) heating a titanium tetrachloride starting material to a temperature of from about 300 to 650° C.;
   (b) heating a stream of oxygen starting material;
   (c) reacting titanium tetrachloride starting material with oxygen starting material by contacting a flow of the heated titanium tetrachloride starting material with a flow of the heated oxygen starting material in an oxidation reactor under oxidation conditions to form a gaseous product stream containing titanium dioxide;
   (d) separating the titanium dioxide from the gaseous product stream to form a process stream from which substantially all the titanium dioxide has been separated;
   (e) analyzing the process stream in real time to detect a concentration of titanium tetrachloride in the process stream;
   (f) comparing the concentration of titanium tetrachloride detected in the process stream to a titanium tetrachloride aim point concentration; and
   (g) modifying the oxidation conditions by increasing or decreasing the flow of the titanium tetrachloride starting material or increasing or decreasing the flow of the oxygen starting material, adjusting oxidation reactor pressure, changing the temperature of heating the titanium tetrachloride starting material or changing the temperature of heating the oxygen starting material, or removing a buildup in the oxidation reactor, to restore or maintain the concentration of titanium tetrachloride in the process stream at the aim point.

2. The process of claim 1 wherein step (c) further comprises addition of silicon tetrachloride by contacting the gaseous product stream with silicon tetrachloride under conditions effective for forming a treated product stream comprising titanium dioxide treated with a silicon-containing compound and wherein in step (d) the gaseous product stream is the treated product stream and the titanium dioxide is separated from the treated product stream.

3. The process of claim 2 wherein step (e) further comprises analyzing the process stream to detect a concentration of silicon tetrachloride in the process stream and step (f) further comprises comparing the concentration of silicon tetrachloride detected in the process stream to a silicon tetrachloride aim point concentration; and step (g) further comprises modifying the conditions for contacting the gaseous product stream with silicon tetrachloride to restore or maintain the concentration of silicon tetrachloride in the process stream at the silicon tetrachloride aim point.

4. The process of claim 3 in which modifying the conditions for contacting the gaseous product stream with silicon tetrachloride reduces the concentration of silicon tetrachloride in the process stream to reach the silicon tetrachloride aim point and the modification of conditions comprises moving the point of addition of silicon tetrachloride closer to or farther from the point where the titanium tetrachloride and the oxygen are initially contacted.

5. The process of claim 1 in which the titanium tetrachloride aim point concentration is zero.

6. The process of claim 3 in which the silicon tetrachloride aim point concentration is zero.

7. The process of claim 1 in which the concentration of titanium tetrachloride is measured by an optical method selected from the group consisting of transmission filter Infrared spectroscopy, transmission Fourier Transform Infrared spectroscopy, Raman spectroscopy, Near Infrared Spectroscopy and Ultraviolet spectroscopy.

8. The process of claim 1 in which the concentration of titanium tetrachloride is measured in a frequency range of from 200 nm to 400 nm, 12,500 cm-1 to 4000 cm-1, and 4000 cm-1 to 400 cm-1.

9. The process of claim 3 in which the concentration of silicon tetrachloride is measured by an optical method selected from the group consisting of transmission filter Infrared spectroscopy, transmission Fourier Transform Infrared spectroscopy, Raman spectroscopy, Near Infrared Spectroscopy and Ultraviolet spectroscopy.

10. The process of claim 3 in which the concentration of silicon tetrachloride is measured in a frequency range of from 200 nm to 400 nm, 12,500 cm-1 to 4000 cm-1, and 4000 cm-1 to 400 cm-1.

11. The process of claim 2 in which the titanium dioxide treated with a silicon-containing compound is at least partially encapsulated with silica.

12. A process for making titanium dioxide, comprising:
    (a) reacting titanium tetrachloride with oxygen by contacting the titanium tetrachloride with the oxygen in an oxidation reactor under oxidation conditions to form a gaseous product stream containing titanium dioxide;
    (b) contacting the gaseous product stream with silicon tetrachloride under conditions effective for treating the titanium dioxide with a silicon-containing compound to form a treated product stream;
    (c) separating the treated titanium dioxide from the treated product stream to form a process stream;

(d) analyzing the process stream in real time to detect a concentration of silicon tetrachloride;

(e) comparing the concentration of silicon tetrachloride detected in the process stream to a silicon tetrachloride aim point concentration; and (g) modifying the conditions for contacting the gaseous product stream with silicon tetrachloride to restore or maintain the concentration of silicon tetrachloride in the process stream at the silicon tetrachloride aim point.

13. The process of claim 12 in which the silicon tetrachloride aim point concentration is zero.

14. The process of claim 12 in which the concentration of silicon tetrachloride is measured by an optical method selected from the group consisting of transmission filter Infrared spectroscopy, transmission Fourier Transform Infrared spectroscopy, Raman spectroscopy, Near Infrared Spectroscopy and Ultraviolet spectroscopy.

15. The process of claim 12 in which the concentration of silicon tetrachloride is measured in a frequency range of from 200 nm to 400 nm, 12,500 cm-1 to 4000 cm-1, and 4000 cm-1 to 400 cm-1.

16. The process of claim 12 wherein the conditions for contacting the gaseous product stream with silicon tetrachloride comprise a mixing step and an elevated temperature and the silicon tetrachloride contacting conditions are modified by adjusting the mixing or the temperature or both.

17. The process of claim 1 in which the process stream is analyzed in process.

18. The process of claim 1 in which the process stream is analyzed by extractive sampling.

19. The process of claim 12 in which the process stream is analyzed in process.

20. The process of claim 12 in which the process stream is analyzed by extractive sampling.

21. The process of claim 1 further comprising recycling the process stream to step (c).

22. The process of claim 12 further comprising recycling the process stream to step (b).

23. The process of claim 1 in which all of the titanium dioxide has been separated from the process stream.

* * * * *

UNITED STATES PATENT AND TRADEMARK OFFICE
CERTIFICATE OF CORRECTION

PATENT NO.        : 7,638,113 B2
APPLICATION NO.   : 11/546764
DATED             : December 29, 2009
INVENTOR(S)       : Bucher, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this

Ninth Day of November, 2010

David J. Kappos
*Director of the United States Patent and Trademark Office*